(No Model.) 7 Sheets—Sheet 1.

J. F. HEADY & J. H. PATTERSON.
CASH INDICATOR AND RECORDER.

No. 382,647. Patented May 8, 1888.

Fig. 1.

Witnesses:
W. C. Jirdinston.
Charles Billon.

Inventors:
John F. Heady, and
John H. Patterson,
by Peck & Rector,
Attorneys.

(No Model.)  7 Sheets—Sheet 3.

J. F. HEADY & J. H. PATTERSON.
CASH INDICATOR AND RECORDER.

No. 382,647.  Patented May 8, 1888.

Fig. 4.

Witnesses:
W. C. Jirdinston.
Charles Billow.

Inventors:
John F. Heady, and
John H. Patterson,
by Peck & Rector
Attorneys.

(No Model.) 7 Sheets—Sheet 4.

J. F. HEADY & J. H. PATTERSON.
CASH INDICATOR AND RECORDER.

No. 382,647. Patented May 8, 1888.

Witnesses:
W. C. Jirdinston.
Charles Billon.

Inventors:
John F. Heady, and
John N. Patterson,
by Peck & Rector,
Attorneys.

(No Model.) 7 Sheets—Sheet 5.

J. F. HEADY & J. H. PATTERSON.
CASH INDICATOR AND RECORDER.

No. 382,647. Patented May 8, 1888.

(No Model.) 7 Sheets—Sheet 6.

J. F. HEADY & J. H. PATTERSON.
CASH INDICATOR AND RECORDER.

No. 382,647. Patented May 8, 1888.

Fig. 8.

Witnesses:
W. C. Jirdinston.
Charles Billow.

Inventors:
John F. Heady, and
John H. Patterson
by Peck & Prietor.
Attorneys.

(No Model.) 7 Sheets—Sheet 7.

J. F. HEADY & J. H. PATTERSON.
CASH INDICATOR AND RECORDER.

No. 382,647. Patented May 8, 1888.

Witnesses:
W. C. Jirdinston.
Charles Billon.

Inventors:
John F. Heady, and
John H. Patterson,
Peck & Peckton
Attorneys.

UNITED STATES PATENT OFFICE.

JOHN F. HEADY AND JOHN H. PATTERSON, OF DAYTON, OHIO, ASSIGNORS TO THE NATIONAL CASH REGISTER COMPANY, OF SAME PLACE.

CASH INDICATOR AND RECORDER.

SPECIFICATION forming part of Letters Patent No. 382,647, dated May 8, 1888.

Application filed November 16, 1887. Serial No. 255,310. (No model.)

*To all whom it may concern:*

Be it known that we, JOHN F. HEADY and JOHN H. PATTERSON, citizens of the United States, residing at Dayton, in the county of Montgomery and State of Ohio, have invented certain new and useful Improvements in Cash Indicators and Recorders, of which the following is a full, clear, and exact description, references being had to the accompanying drawings, forming part of this specification.

Our invention relates to improvements in cash indicators and recorders designed for the use of store-keepers and others, and has for its object the improvement of that class of machines represented by Patents No. 318,506, of May 26, 1885, to James Ritty, and No. 351,459, of October 26, 1886, to Patterson, Davis, and Herrman.

The novelty of our invention will be herein set forth, and specifically pointed out in the claims.

In the accompanying drawings.

The same letters of reference are used to indicate identical parts in all the figures.

The object of the present machine is to indicate to the purchaser upon a figured tablet the amount of the sale by operating the proper key, and by said operation to sound an alarm, release the money drawer or till, which is then partially propelled from the case, and to record the value of the key operated by puncturing the roll of paper extending across the entire bank of keys, and properly printed to indicate the value of each perforation.

The novelty of the invention consists in improvements in the construction of this class of machines, whereby they are simplified and rendered more efficient in operation, all as will be hereinafter pointed out.

The general construction of this class of machines is so well known that it is sufficient to here say that A is the case; B, the frame-work supporting the mechanism within the case; C, the operating-keys pivoted upon the shaft D; E, the vibrating frame, which is operated whenever any key is depressed; F, the tablet-rods; G, the tablet-supporting wing, and H the bell or gong.

I is the money-drawer or till located in the lower part of the case, and which when shut is held locked by the bolt J, and when unlocked by the vibration of the bolt-lever K is projected by the spring L.

In this class of machines the vibrating frame has heretofore been arranged under the keys in front of their pivotal support, which arrangement necessitated the employment of weights or springs to reset it after each operation of a key. Also, being near the slots in the front of the case through which the keys project, it could be reached and held down by an instrument inserted through the key-slots, and while in this position the machine could be operated to expose the proper indicating tablet without sounding the gong or moving the recording-paper, and thus if the same key were operated successively its puncturing-pin would continue to pass through the recording-paper in exactly the same spot, and thus only one purchase would be recorded. To overcome these objections, under our improved construction the vibrating frame E is arranged to extend over the keys in rear of the shaft D, upon which it is hung by the connecting arms M, constituting part of the vibrating frame.

Figure 1:
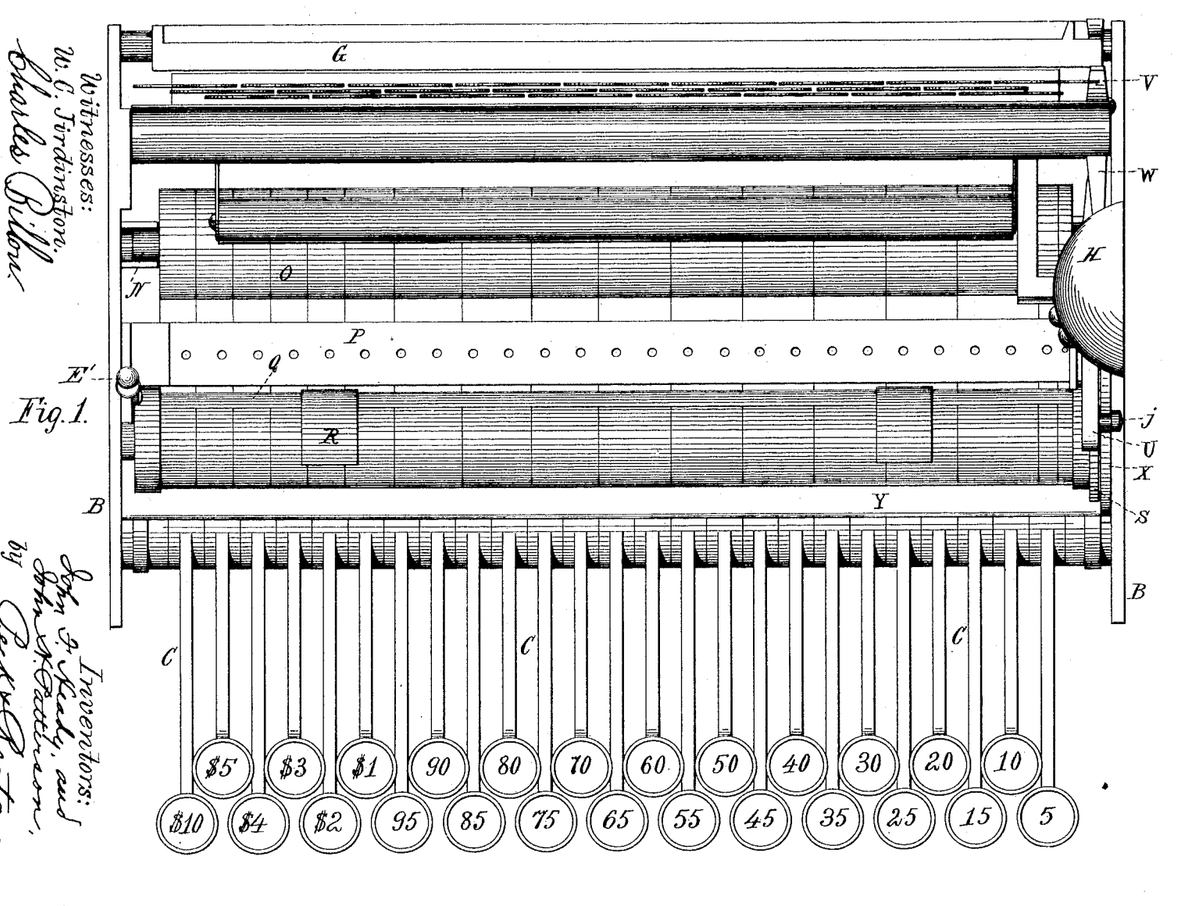
Figure 1 is a plan view of the machine removed from its case.
Figure 4:
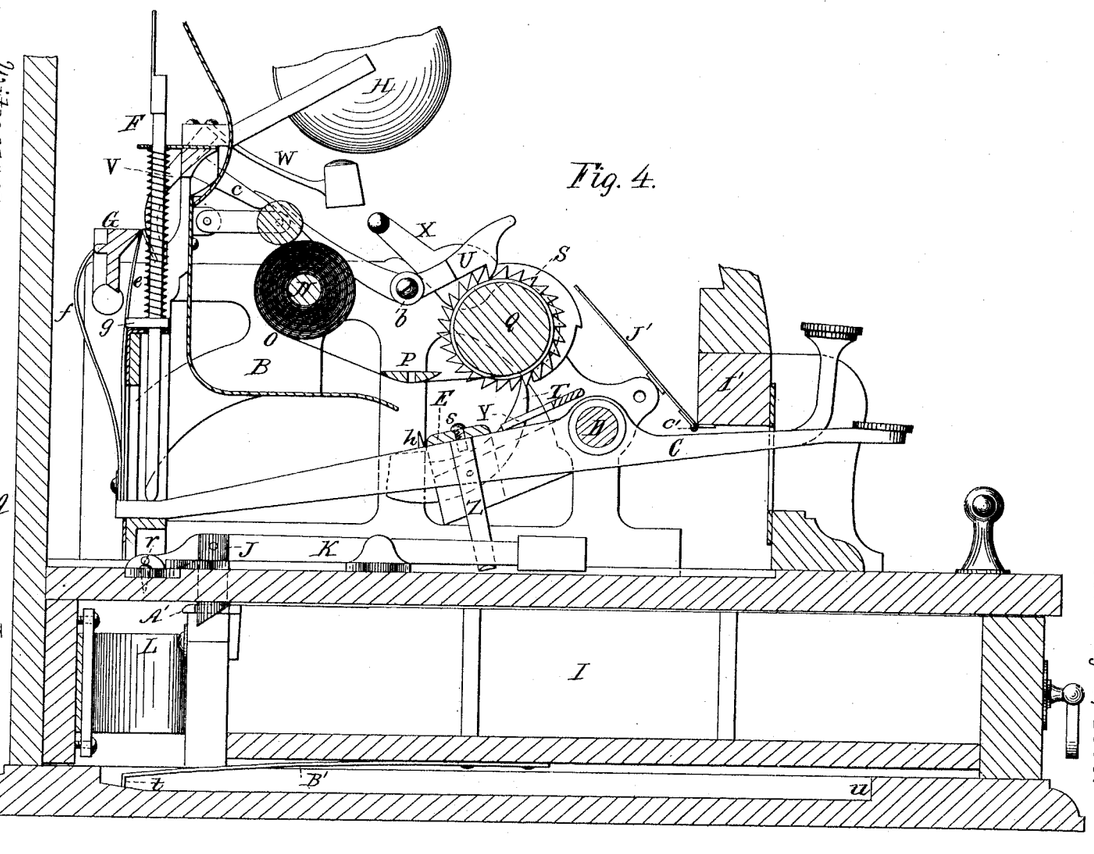
Fig. 4 is a central sectional view of the machine in elevation, with a portion of the case broken away.
Figures 5, 6, 11:
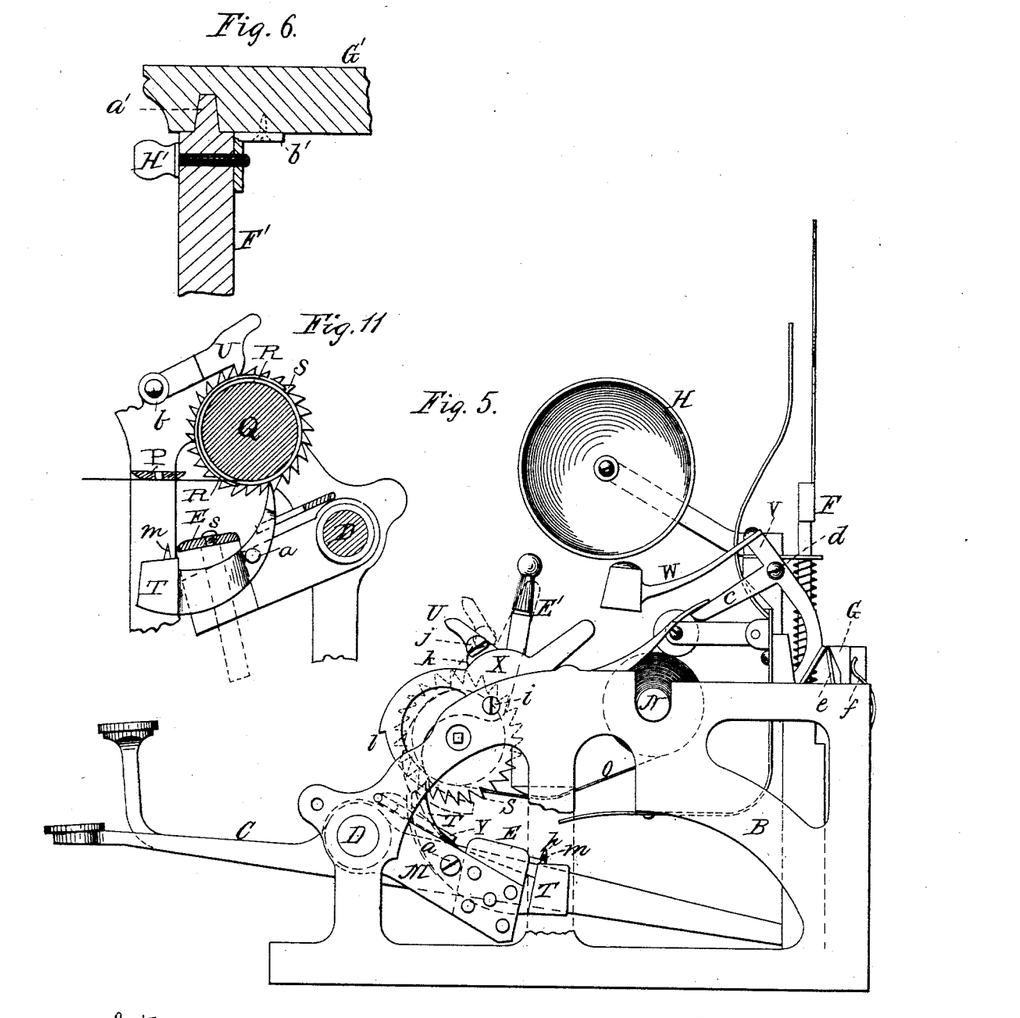
Fig. 5 is an opposite end elevation of the machine removed from the case.
Fig. 6 is a detail, in section, of a corner of the top of the case.
Fig. 11 is a sectional view taken next the dog T, showing its arrangement relative to its support and registering wheel.

N is the roll containing the paper O, suitably and removably journaled in the frame B, and from which the paper is drawn forward under the perforated bar P and up around the rewinding-roll Q, to which it is secured by metal spring-clips R, Fig. 1, partially surrounding and snugly embracing said roll. That end of the roll Q which is on the side of the machine where the gong is located is provided with a ratchet-wheel, S, with which a dog, T, pivoted, as at $a$, to the subjacent arm M of the vibrating frame, engages. Pivoted to the side of the frame, as seen at $b$, Fig. 4, is a dog, U, which rides upon and engages with the ratchet-wheel S, and whose rear end rests upon an arm, $c$, projecting from the gong-hammer lever V, which, as seen in Fig. 5, is pivoted at $d$ to the side of the frame. The lever V carries the gong-hammer W, and is held in constant normal position by a spring, $e$. It results from this construction that the spring $e$ serves to hold the dog U in constant engagement with the ratchet S, except when a key is depressed, whereupon the turning of the roller Q through the medium of the dog T lifts the dog U by the passage under it of one of the ratchet-teeth, and thereby depresses the gong-hammer against the resistance of the spring $e$ until the tooth of the ratchet having passed under the dog U the latter is released, and the spring $e$, acting upon the lever V, causes the hammer to strike the gong. As the lower end of the lever V engages with the wing G, the vibration of the former pushes back the wing against the resistance of the spring $f$ to permit the passage of the detent or shoulder $g$ of the tablet-rod, so that the operation of a key, each of which is provided with its puncturing pin or point $h$, turns the roll Q one notch of its ratchet-wheel, punctures the paper, sounds the gong, and exposes its tablet to view, thus indicating and recording the value of the purchase made.

To enable the rewinding-roll Q to be released from the dogs U and T when it is desired to take off the paper containing the registry of sales for any given period of time, a cam-lever, X, is provided, which, as seen in Fig. 5, is pivoted to the frame at $i$ between the ratchet-wheel and said frame. A pin or projection, $j$, upon the dog U rests upon a cam projection, $k$, of the lever X, and the lower end of said lever is curved around to form a disengaging-cam, and is provided with a shoulder or engaging-notch, $l$. The normal position of the lever X is shown by the solid lines in Fig. 5, and when it is desired to release the dogs U and T the lever is drawn forward to the position shown in the dotted lines in said figure, whereupon the lower cam-surface throws the dog T out of engagement with the ratchet, and the notch $l$ is brought around to engage with said dog and hold it out of engagement, and the cam projection $k$, pressing upon the pin $j$, throws the dog U up out of engagement with the ratchet S, thus releasing the roller Q. The purpose of the notch $l$ engaging with the dog T is to enable the dog U to be re-engaged automatically by the operation of any key should the attendant forget to throw back the lever X, for the operation of a key would cause the dog T in its re-engagement with the ratchet to press upon the notch $l$, thereby partially throwing back the lever X until the pin $j$, having passed in front of a vertical plane through the pivot $i$, the completion of the throw of the lever X would be accomplished by the pressure of the spring $e$ upon the dog U.

Figure 8:
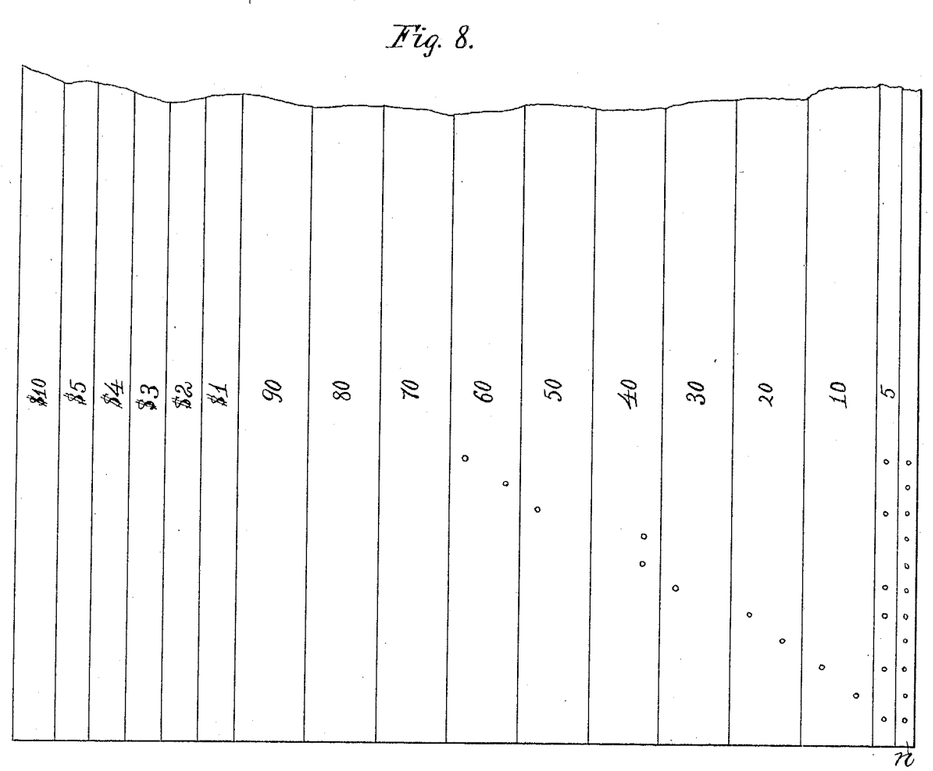
Fig. 8 represents a plan view of a portion of the paper.

In addition to the puncturing-pins $h$ we provide the weighted rear end of the dog T with an auxiliary puncturing-pin, $m$, so that at every operation of the machine a puncture is made in the space $n$ of the paper at one side, as seen in Fig. 8, where the dots in said figure represent punctures, thus enabling the proprietor the more readily to ascertain how often the machine has been operated in any given period of time. Instead of attaching this puncturing-pin $m$ to the dog T, it may be placed in any suitable position upon the vibrating frame E and the same result accomplished. In either case the pin $m$ is actuated by the vibrating frame.

Another feature of our invention relates to the application of a five-cent or odd-number carrying-bar to this class of machines, whereby the five of each odd-numbered key operated is recorded in the five cent space of the recording-paper and the tens of its value in the space bearing the next lower even multiple of five, thereby avoiding the necessity of any odd-numbered spaces on the recording-paper and greatly simplifying the work of ascertaining the total amount recorded during any given period of time. In this respect our invention is an improvement on the construction shown and described in Patent No. 325,260, of September 1, 1885, to W. H. Maxwell, and consists in the application of this feature of that invention to machines of the class shown and described in this application.

Figure 7:
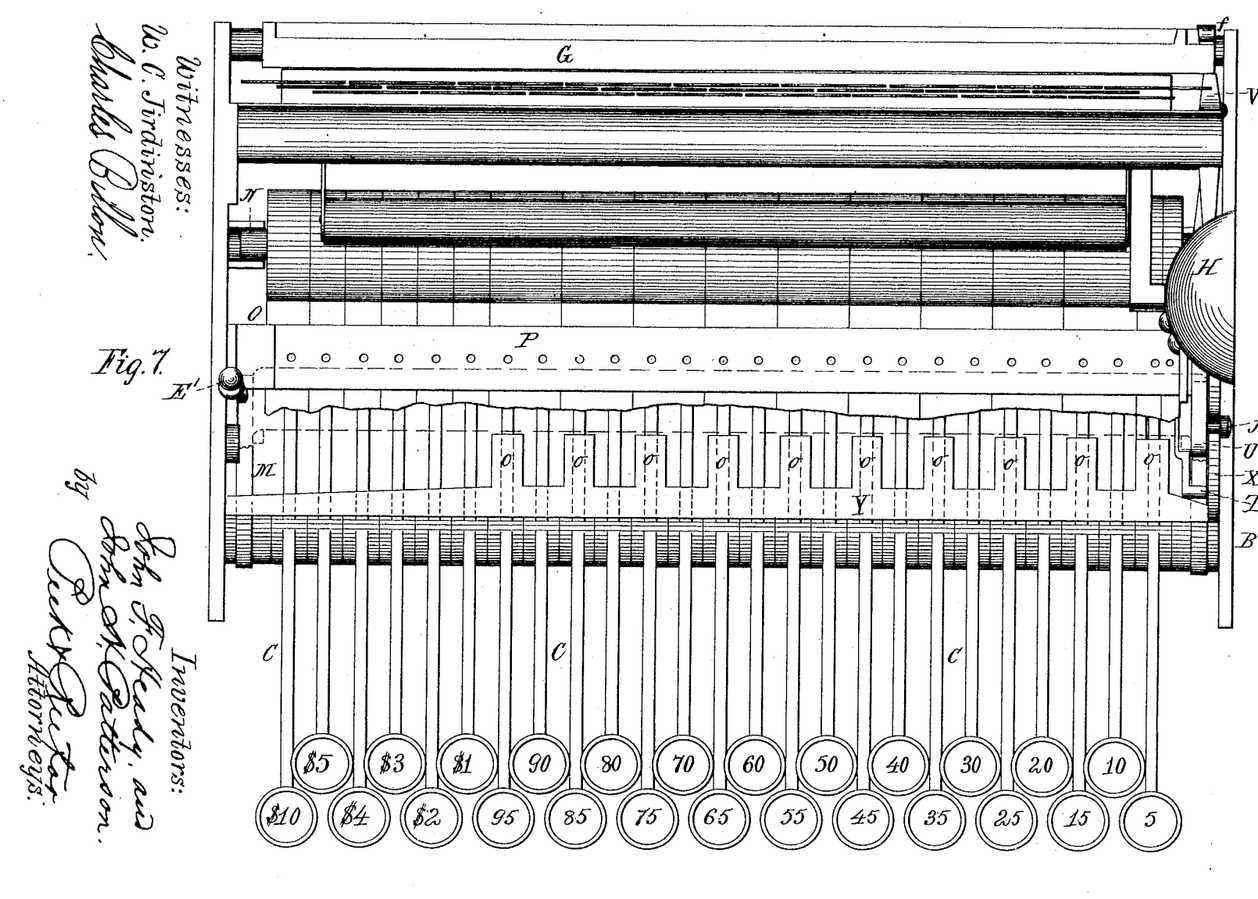
Fig. 7 is a plan view of the machine removed from the case, and having the rewinding-roller removed and the paper torn off to expose the five-cent bar, and showing the vibrating frame entirely in dotted lines.
Figure 9:
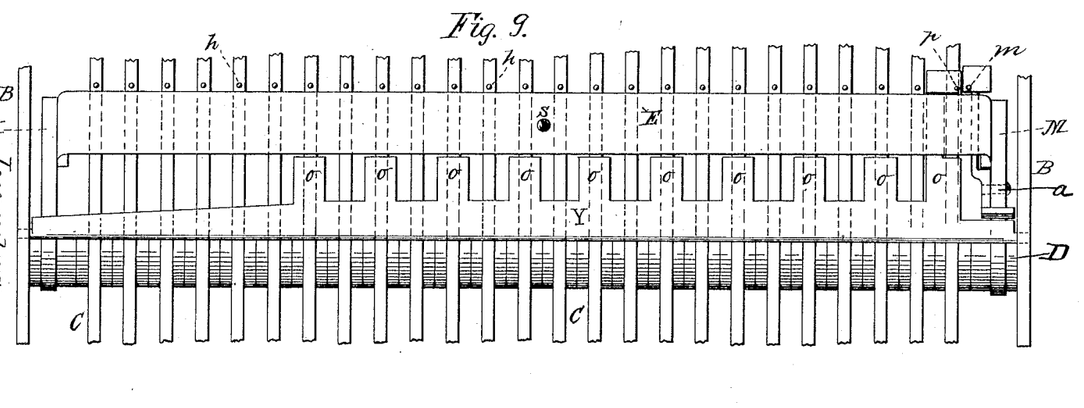
Fig. 9 is a detail plan view of the vibrating frame, five-cent bar, and portions of the main frame and keys.
Figure 10:
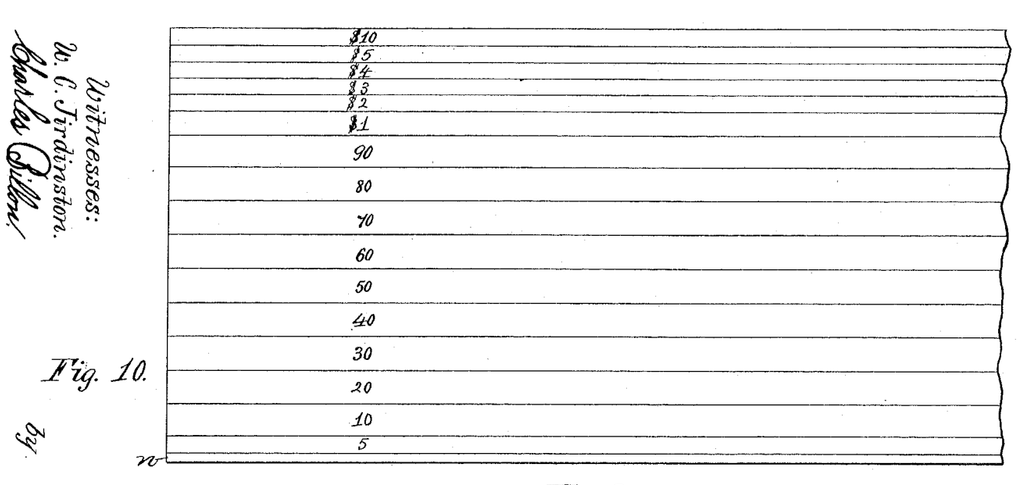
Fig. 10 is a diminished plan view of a portion of the recording-paper.

By reference to Figs. 7 and 9 the construction, arrangement, and mode of operation of this five-cent bar may be explained. It consists of a bar, Y, pivoted in the frame B slightly in rear of and just above the key-shaft D, and provided at intervals with backward and downward extensions $o$, one resting upon each of the keys indicating an odd multiple of five. The extension $o$, which is in line with the five-cent space on the recording paper, passes back under the vibrating frame E and is provided on its upper side with a puncturing-pin, $p$, in line with the puncturing pins $h$ and $m$. When the keys which indicate even multiples of five are operated, they play between the extensions $o$ of the bar Y, and said bar remains at rest; but whenever a key indicating an odd multiple of five is operated it engages with one of the extensions $o$ and actuates the bar Y to cause its puncturing-pin $p$ to puncture the recording-paper in the five cent space.

It will be observed that there are no spaces on the recording-paper bearing odd multiples of five above the first power. Each odd-numbered key is so arranged that its pin punctures the recording-paper in the space bearing the next lower even multiple of five, while the pin of the key indicating said next lower even multiple of five also punctures the paper in the same space. Thus the pins of the ten and fifteen cent keys puncture the ten-cent space, those of the twenty and twenty-five cent keys the twenty-cent space, and so on. In this manner, whenever any odd-numbered key is operated, the tens of its value are recorded in the space bearing the next lower even multiple of five and the five of its value in the five-cent space.

The five-cent key may have its individual puncturing-pin, or, as shown in Fig. 9, the extension $o$, which is in line with the five cent space, may extend laterally over the five-cent key in such manner that at each operation of the five-cent key the bar Y will be actuated to cause its pin $p$ to puncture the paper in the five-cent space. The pin $p$ of the five cent bar thus takes the place of a pin on the five-cent key.

It will be understood that the particular form of the five-cent bar is immaterial, it being only necessary that it be arranged to be actuated by the operation of each of the keys indicating odd multiples of five above the first power, and to remain at rest during the operation of the even-numbered keys. It will also be understood that while we have shown the puncturing-pin of the five-cent bar as attached directly to said bar or one of its extensions, it is only necessary that said pin be so arranged as to be actuated by said bar, which may be done directly, as shown, or indirectly.

It follows from this construction and operation that in calculating the total amount recorded at the end of any given period of time each of the punctures made in any one of the spaces represents an amount corresponding to the number of that space, although some of the punctures in the even-numbered spaces may have been made by an odd-numbered and some by an even-numbered key, the fives of the odd numbers having been recorded in the five-cent space, as before explained. It will be readily seen that this greatly simplifies the work of ascertaining the total amount recorded, as there are only about half the number of spaces that would otherwise be necessary and only one of these spaces represents an odd number.

It is evident that types or other devices might be substituted for the puncturing-pins for accomplishing the same result without departing from our invention.

The mechanism for locking the drawer and releasing it whenever any key is operated is illustrated in Fig. 4, where the bolt-lever K, pivoted at $r$, has its forward end weighted and is connected to the vibrating frame by a link, Z, which passes up between two of the keys and is secured to the bar E by a screw or other fastening, $s$. The operation of any key in lifting the bar F raises the lever K and lifts the bolt J out of engagement with the catch A' of the drawer, which, thus released, is projected from the case by the spring L. Upon the bottom of the drawer and projecting from its rear end is a spring-stop, B', with its rear end bent down to form a hook or detent, $t$, which engages against a shoulder, $u$, in the bottom of the case to prevent the drawer being accidentally propelled entirely out of the case by the throw of the spring L; but which, should it be desired to remove the drawer from the case for any purpose, can be pressed up by hand to disengage the hook $t$ from the shoulder $u$, as will be readily understood.

Figures 2, 3:
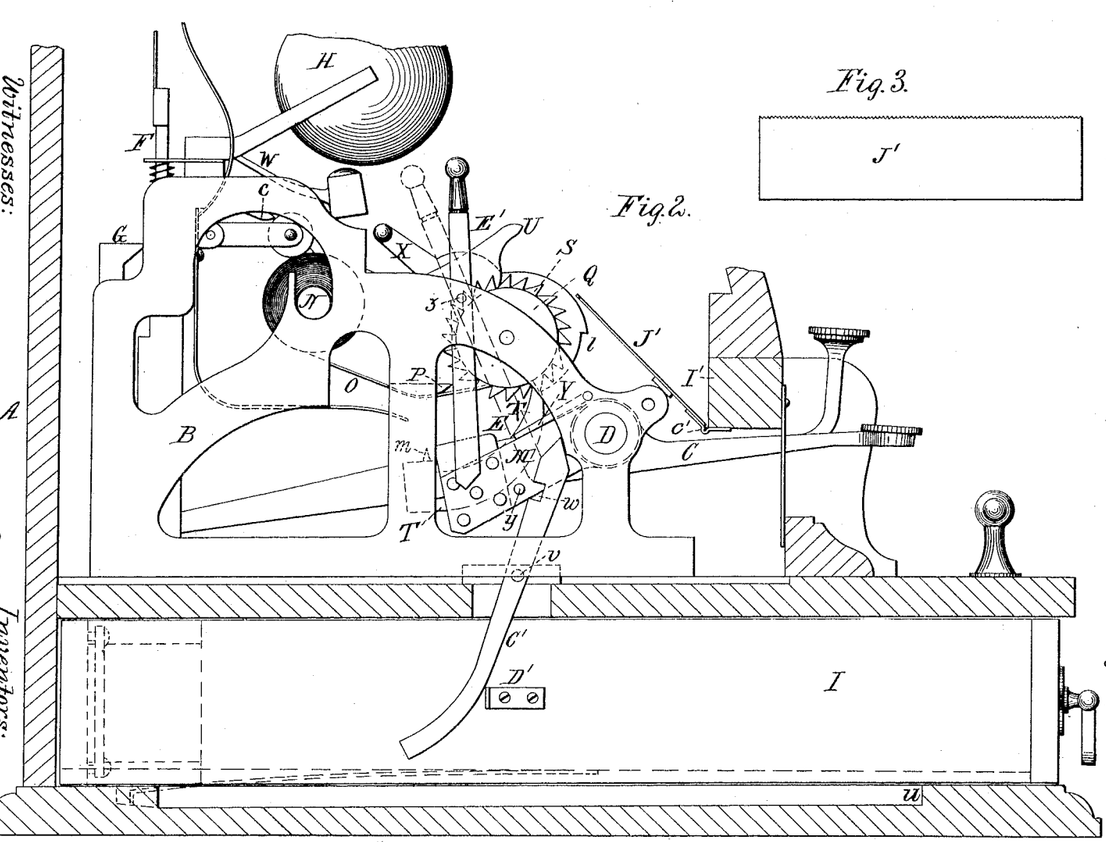
Fig. 2 is a side elevation of the machine, with a portion of the case in section.
Fig. 3 is a diminished view of the hinged cutter-bar for severing the paper.

To prevent the keys being successively operated without first locking the drawer after each operation of a key, we provide a gravitating latch, C', Fig. 2, which pivoted to the side of the case, at $v$, extends downward along the outer side of the drawer and upward alongside one of the arms M of the vibrating frame, where a notch, $w$, is formed in the latch, which, when the drawer is opened or partially opened, swings by the gravity of the latch over a projecting pin, $y$, upon the arm M, and thus holds the keys locked from operation. A shoulder or projection, D', is secured upon the side of the drawer in such position that when the latter is pushed in and locked the latch C' is tilted to the position shown in Fig. 2, and out of engagement with the vibrating frame. Should the proprietor, however, desire to throw this latch out of working position for a time, as during an unusual rush of business, a lever, E', is provided, which, pivoted, as at $z$, to the side of the frame, has its lower end so extended that when pushed back to the position shown by the dotted lines in Fig. 2, it engages with and holds the latch C' out of engagement.

Fig. 6 represents a secure removable fastening for the top of the case, which occasionally has to be taken off to remove the glasses of the reading-opening when it is desired to clean them. Each side F' of the case is provided with one or more dowel-pins, $a'$, which are recessed in the under side of the top G', which has screwed to it angle irons $b'$, which fit snugly to the sides and top at their angles. A thumb-screw, H', passes through the side of the case and is screwed into the angle-iron, as shown, thus forming a secure, and at the same time a removable, fastening.

To enable the paper to be readily severed when it is desired to remove the paper from the rewinding-roll, we hinge, at $c'$, to the bar I' of the case, at its front, a flat cutter bar or blade, J', whose top edge is serrated, as seen in Fig. 3. This blade, when desired for use, can be swung to a vertical position and the paper severed by pressing it upon its upper serrated edge, and when not in use can be swung down, as shown in Fig. 2, to shield and hide the mechanism beneath.

Having thus fully described our invention, we claim—

1. In a cash indicator and recorder, the combination, with the recording-paper and a series of keys representing odd multiples of five above the first power, of a five cent bar provided with a puncturing-pin and arranged to be actuated by said keys, whereby upon operating any one of said keys said bar is actuated to cause its pin to puncture the recording-paper, substantially as described.

2. In a cash indicator and recorder, the combination, with the recording-paper provided with a five cent space and a series of spaces indicating even multiples of five, and a series of keys indicating even and odd multiples of five above the first power, and each provided with a puncturing-pin, of a five-cent bar provided with a puncturing-pin and arranged to be actuated by each of the keys representing an odd multiple of five, substantially as and for the purpose described.

3. In a cash indicator and recorder, the combination, with the recording-paper provided with a five-cent space and a series of spaces indicating even multiples of five, a series of keys representing five and the even and odd multiples thereof, and a series of puncturing-pins, one on each of said keys excepting the five-cent key, of a five-cent bar provided with a puncturing-pin and arranged to be actuated by each of the keys representing an odd multiple of five, substantially as and for the purpose described.

4. In a cash indicator and recorder, the combination, with the recording-paper, a series of keys representing odd multiples of five above the first power, and a series of tablet-rods and indicating-tablets, one for each key, of a five-cent bar provided with a puncturing-pin and arranged to be actuated by said keys, substantially as and for the purpose described.

5. In a cash indicator and recorder, the combination, with the recording-paper provided with a five-cent space and a series of spaces indicating even multiples of five, a series of keys representing even and odd multiples of five above the first power, and each provided with a puncturing-pin, and a series of tablet-rods and indicating-tablets, one for each key, of a five-cent bar provided with a puncturing-pin and arranged to be actuated by the operation of any one of said keys representing an odd multiple of five, substantially as and for the purpose described.

6. In a cash indicator and recorder, the combination, with the recording-paper provided with a five-cent space and a series of spaces indicating even multiples of five, a series of keys representing five and the even and odd multiples thereof, a series of puncturing-pins, one for each key, excepting the five-cent key, and a series of tablet-rods and indicating-tablets, one for each key, of a five-cent bar provided with a puncturing-pin and arranged to be actuated by each of the keys representing odd multiples of five, substantially as and for the purpose described.

7. In a cash indicator and recorder, the combination, with a series of keys provided with puncturing-pins, of a bar extending across said keys and arranged to be vibrated by the operation of any one of them, and an auxiliary puncturing-pin actuated by said vibrating bar to puncture the recording-paper whenever any key is operated, substantially as and for the purpose described.

8. In a cash indicator and recorder, the combination, with a series of keys provided with puncturing-pins, of a vibrating frame extending across said keys and arranged to be vibrated by the operation of any one of them, substantially as described, and an auxiliary puncturing-pin actuated by said vibrating frame to puncture the recording-paper whenever any key is operated, as and for the purpose specified.

9. In a cash indicator and recorder, the combination, with a series of keys pivoted on a through-shaft at the front of the machine, a series of tablet-rods and indicating-tablets operated by said keys, and recording mechanism for recording the values of the keys operated, of a vibrating frame extending transversely across the top of said keys in rear of their pivotal support, substantially as and for the purpose described.

10. In a cash indicator and recorder, the combination, with a series of keys pivoted on a through-shaft at the front of the machine, a series of tablet-rods and indicating-tablets operated by said keys, recording mechanism for recording the values of the keys operated, and a gong and gong-hammer, of a vibrating frame extending transversely across the top of said keys in rear of their pivotal support, and connecting mechanism between said vibrating frame and gong-hammer, whereby whenever any one of the keys is operated the vibrating frame is lifted to cause the sounding of the gong, substantially as described.

11. In a cash indicator and recorder, the combination, with a series of keys pivoted on a through-shaft at the front of the machine, a series of tablet-rods and indicating-tablets operated by said keys, recording mechanism for recording the values of the keys operated, gong mechanism which is sounded whenever any key is operated, a spring-projected money-drawer, a locking-bolt for locking said drawer in its closed position, and a bolt-lever connected to said locking-bolt, of a vibrating frame extending transversely across the top of the keys, in rear of their pivotal support, and connecting mechanism between said vibrating frame and bolt-lever, whereby when said vibrating frame is lifted by the operation of any key the bolt-lever is actuated to unlock the drawer, substantially as described.

12. In a cash indicator and recorder, the combination, with a series of keys pivoted on a through-shaft at the front of the machine, a series of tablet-rods and indicating-tablets operated by said keys, and recording-paper carried on a supply-roll and a rewinding-roll, of a vibrating frame extending transversely across the top of said keys, in rear of their pivotal support, and connecting mechanism between said vibrating frame and rewinding-roll, whereby the lifting of said vibrating frame by the operation of any key causes the partial rotation of said rewinding-roll, as and for the purpose specified.

13. In a cash indicator and recorder, the combination of a series of keys of fixed values, a series of tablet-rods and indicating-tablets operated by said keys, a supporting-wing for holding said tablets exposed to view, a gong and gong-hammer, a supply and a rewinding roll for carrying the recording-paper, a vibrating frame actuated by the operation of any one of the keys, connecting mechanism between said vibrating frame and rewinding roll, and connecting mechanism between said rewinding-roll and said gong-hammer and supporting-wing, whereby the operation of the rewinding-roll through the medium of the vibrating frame causes the hammer to strike the gong and the wing to be thrown back to permit the passage of a tablet-rod whenever any key is operated, substantially as described.

14. In a cash indicator and recorder, the combination, with the rewinding-roll, its actuating-dog, and overriding holding-dog provided with a laterally-projecting pin, of a spring-pressed cam-lever pivoted by the side of said ratchet and arranged to engage with said dogs, whereby upon turning said cam-lever both dogs are thrown out of engagement with the ratchet, and whereby upon subsequently operating any key of the machine the cam-lever is thrown back to its normal position and both dogs re-engaged with the ratchet, as and for the purpose specified.

15. In a cash register and indicator, the combination, with a series of operating-keys, a vibrating frame actuated whenever any key is operated, and a money-drawer with locking mechanism which is released when any key is operated, of a pivoted weighted latch adapted to engage with said frame to lock it when the drawer is opened or partially opened, and normally held out of engagement with said frame by the drawer when the latter is closed, substantially as described.

16. In a cash indicator and recorder, the combination, with a series of operating-keys, a vibrating frame actuated whenever any key is operated, and a money-drawer with locking mechanism which is released when any key is operated, of a latch arranged to engage with said vibrating frame when the drawer is opened or partially opened, and to be thrown out of engagement when the drawer is closed, and a lever for holding said latch out of engagement when desired, whereby the latch may be allowed to engage with the vibrating frame to hold the machine locked from operation while the drawer is open, or may be held constantly out of engagement with the vibrating frame to allow the machine to be operated at all times, substantially as described.

17. The combination and arrangement of the spring $f$, wing G, gong-hammer lever V, engaging with the wing G and provided with an extension, $c$, dog U, having a rear extension engaging with the extension $c$, pin $j$, cam-lever X, provided with a cam projection, $k$, and shoulder $l$, the rewinding-roll Q, provided with the ratchet S, with which the dog U engages, the operating-dog T, vibrating frame E, and keys C, substantially as and for the purpose described.

18. The combination, with the supply and rewinding rolls, the latter provided with wheel S, of the vibrating frame E, the keys operating to vibrate it, and the dog T, pivoted upon said frame, engaging the ratchet S and provided with the puncturing-pin $m$, arranged to operate on the paper passing between the rollers, substantially as described.

19. The combination, with the series of operating-keys, each provided with a puncturing-pin, the record-paper, and means for supporting the same, of the five-cent bar Y, provided with a puncturing-pin, $p$, and extensions $o$ engaging the odd-numbered keys, substantially as described.

20. The combination and arrangement, with the operating-keys, of the drawer I, provided with the shoulder D', the pivoted latch C', having the notch $w$, and the vibrating frame E, provided with the pin $y$, substantially as and for the purpose described.

21. The combination and arrangement, with the operating-keys, of the drawer I, provided with the shoulder D', the pivoted latch C', having the notch $w$, the lever E', and the vibrating frame E, provided with the pin $y$, substantially as and for the purpose described.

22. In a cash indicator and recorder provided with a supply and a rewinding roll, the combination, with the paper carried on said rolls, of the serrated cutter-bar J', extending transversely across the machine and hinged, as at $e'$, to the bar I' of the case, and adapted when swung into vertical position to sever the end of the paper drawn across it, and adapted when turned down to shield and hide the mechanism beneath, substantially as described.

JOHN F. HEADY.
JOHN H. PATTERSON.

Witnesses to John F. Heady's signature:
N. LINDENFELD,
S. B. LOCKWOOD.

Witnesses to John H. Patterson's signature:
HENRY THEOBALD,
THOS. CORWIN.